INFLUENCE OF AN ENDOTHERMIC REACTION ON TEMPERATURE PROFILE
50% $O_2$ CONVERSION
BATTERY DIMENSIONS 1.5 FT. X 1.5 FT. X 1.5 FT.

United States Patent Office 3,488,226
Patented Jan. 6, 1970

3,488,226
PROCESS FOR GENERATION OF HYDROGEN FROM HYDROCARBONS AND USE THEREOF IN MOLTEN CARBONATE FUEL CELLS
Bernard S. Baker and Amanullah R. Kahn, Chicago, Ill., assignors to Institute of Gas Technology, a not-for-profit corporation of Illinois
Filed Nov. 8, 1965, Ser. No. 506,778
Int. Cl. H01m 27/00
U.S. Cl. 136—86     10 Claims

ABSTRACT OF THE DISCLOSURE

The specification discloses a process for operation of a high temperature molten carbonate fuel cell by low temperature, low pressure steam reforming of liquid hydrocarbons using a nickel-alumina-aluminum catalyst to produce a hydrogen-rich gas suitable for direct use in the fuel cell. The reforming reaction is carried out in heat exchange relationship with the fuel cell whereby the fuel cell heat sustains the endothermic reforming reaction. In one embodiment the reforming catalyst is placed in the fuel cell anode chamber.

This invention relates to an improved process for the conversion of hydrocarbons into hydrogen-rich gases which can be utilized in a molten carbonate electrolyte type fuel cell for the production of electrical energy. In particular, the invention relates to a process whereby hydrocarbons having an end boiling point up to 500° F. are converted by a steam reforming process to hydrogen-rich gas. This gas is then suitable for use as fuel in a molten carbonate type fuel cell. Because of the lof temperature employed in this reforming process, it is possible to use the waste heat from the fuel cell to sustain the reforming reaction and by so doing improve the temperature distribution in the fuel cell.

Considerable intereste during the past few years has been focused on the electrochemical conversion of a chemical fuel and oxidant in a fuel cell to produce electricity. Because of its noiseless and efficient operation, the fuel cell is a very desirable device for production of electricity. In the past, most of the development work has been with fuel cells using pure hydrogen as fuel and oxygen or air as the oxidant. Hydrogen is a very desirable electro-chemical fuel since it is highly reactive. Nevertheless, hydrogen as a fuel has two major drawbacks—high cost and difficulty in storage.

The ideal fuel cell would be one which could consume hydrocarbons directly for the production of electrical energy. However, although such processes are technically possible, they are not economically practical because of the high cost of fuel cell catalysts needed to achieve this type of oxidation.

One process for the production of hydrogen-rich gases from hydrocarbons for fuel cells utilizes catalytic steam reforming and has as its goal the production of pure hydrogen via palladium diffusion. This process is undesirable because it requires expensive high temperature and high pressure equipment.

Prior art in catalytic steam reforming of hydrocarbon feeds having an end boiling point up to 500° F. teaches the use of high temperatures, above 1100° F. and high steam to hydrocarbon ratios, typically more than 4.5 pounds steam per pound of hydrocarbon. In order to avoid carbon deposition and subsequent plugging of catalyst beds, especially at super atmospheric pressures and in the presence of non-paraffinic hydrocarbons, the steam to hydrocarbon ratio must be substantially higher. Examples of such minimum steam to hydrocarbon ratio at typical operating temperature of 1100° F. to 1850° F. and pressures up to 350 p.s.i.g. are described in U.S. Patent No. 3,106,457.

Where low temperature steam reforming of liquid hydrocarbons has been practiced for the purpose of making methane at temperatures below 1100° F., as described in British Patent No. 820,257, the composition of the gas produced contains relatively low amounts of hydrogen. In such processes, the presence of olefins and aromatics in the feed is deleterious and harmful to catalyst activity. It is, therefore, desirable to provide a process for the production of hydrogen by the catalytic steam reforming of hydrocarbons free from the above limitations.

It is thus an object of this invention to produce continuously from all types of hydrocarbons having an end boiling point up to 500° F., hydrogen-rich gases which after reforming are suitable for use in high temperature molten carbonate fuel cells.

It is another object of this invention to produce continuously from such hydrocarbons hydrogen-rich gases suitable for use in high temperature fuel cells via a process wherein the heat from the fuel cell is used to sustain the endothermic reforming reaction.

It is a further object of this invention to produce continuously from such hydrocarbons hydrogen-rich gases suitable for use in high temperature fuel cells wherein the reformer acts as a heat sink for heat produced by the fuel cell. The proximity of the reformer to the fuel cell mitigates the problem of hot spots in the fuel cell because of the heat sink effect.

It is another object of the invention to produce continuously from hydrocarbons having an end boiling point up to 500° F., hydrogen-rich gas suitable for use in high temperature molten carbonate fuel cells, wherein the hydrocarbons may contain olefins and aromatics.

Another object of this invention is to produce continuously from such hydrocarbons hydrogen-rich gases for use in high temperature molten carbonate fuel cells by a process which can operate at significantly lower pressures than are normally required for hydrogen generation processes for fuel cells. In the conventional fuel process, hydrogen is purified by passage through a palladium diffuser which operates at elevated pressures.

Another object of this invention is to produce from hydrocarbons a hydrogen-rich gas whereby the gas to produced is at a lower temperature than is conventional for the steam reforming processes and where the steam-to-hydrocarbon feed ratio is also lower than in such other processes. Therefore, the process is more efficient since less heat is needed for process steam.

Other objects will become apparent as the invention is more fully described hereinafter.

Figure 1:
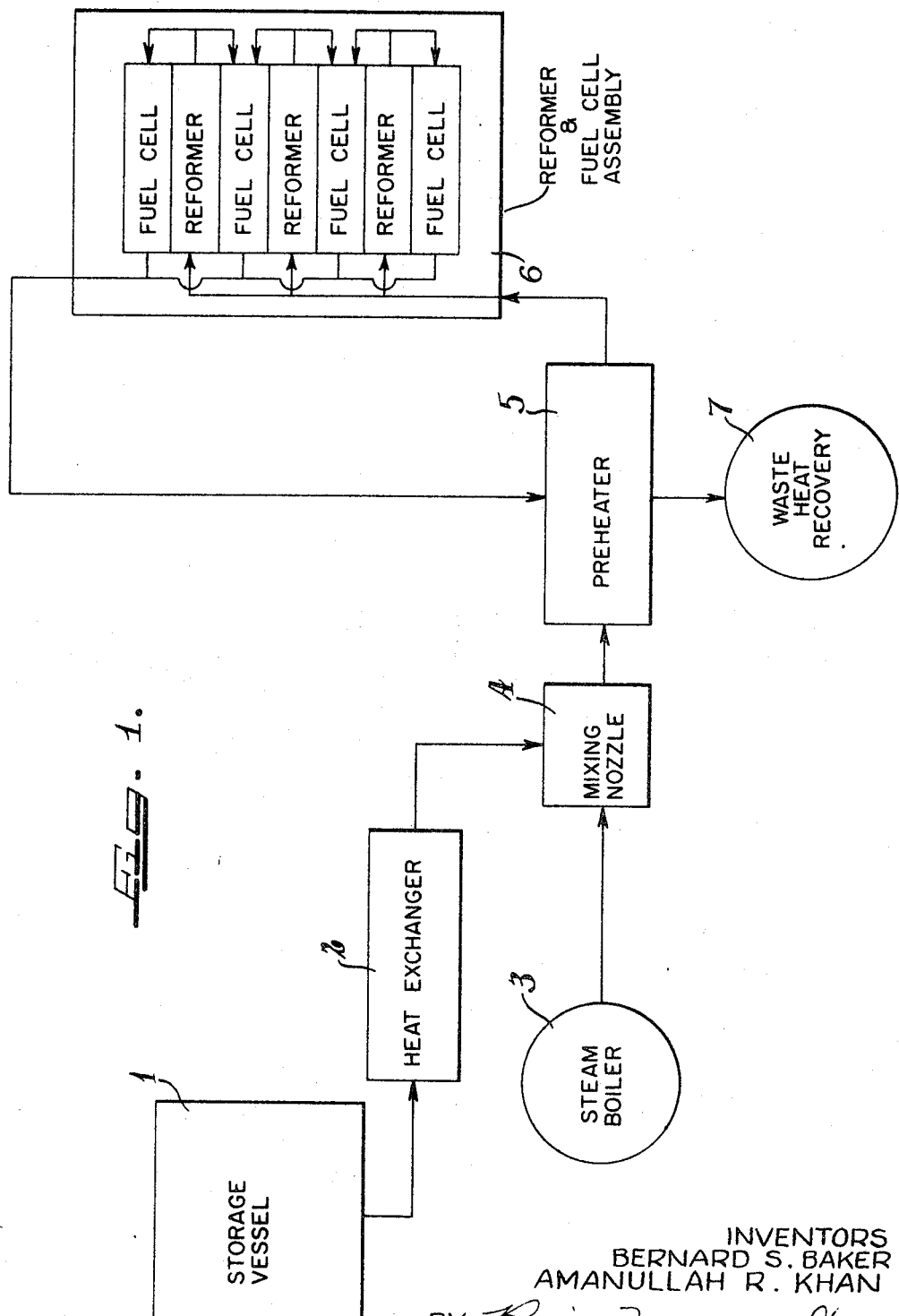
FIG. 1 is a schematic flow diagram showing the process of the invention.

When hydrocarbons such as petroleum distillates are reformed with steam over a highly active catalyst the following reaction occurs:

$$C_nH_{2n+2} + H_2O \rightarrow CH_4 + CO_2 + H_2$$

The precise composition of the resulting gas is determined by the reaction conditions and by the following reactions both of which tend to approach equilibrium at the preferred reaction conditions:

$$CO + 3H_2 \rightleftarrows CH_4 + H_2O$$
$$CO + H_2 \rightleftarrows CO_2 + H_2$$

In order to achieve the maximum hydrogen production in the process of this invention, the following principles apply: High temperatures, low pressures and high steam-to-hydrocarbon feed weight ratios, increase hydrogen yield. As pressure is decreased, hydrogen yield is increased and methane yield is decreased. As temperature is increased, hydrogen yield is increased and methane yield decreased. As steam-to-hydrocarbon ratio is increased, the hydrogen yield increases.

At any given temperature and pressure, a limiting steam to hydrocarbon ratio exists; further increase in steam beyond the limiting ratio results in negligible increases in hydrogen yield and decreases in methane yield. The yield of carbon dioxide increases with an increase in steam-to-hydrocarbon feed weight ratio and increases with a decrease in temperature, but varies only slightly with changes in pressure. In addition, the molecular weight and composition of the feedstock dictate the optimum temperature and pressure conditions and steam-to-hydrocarbon feed weight ratios.

In selecting steam-to-hydrocarbon feed weight ratios for this process, we have found the following to be true: As the aromatic and olefin contents and the molecular weight of the feed increase, and as the temperature increases, more steam is required to prevent carbon deposition will depend upon the molecular weight and composition of the feedstock for any given set of reactor operating conditions.

The objects of our invention are achieved by reacting hydrocarbons having an end boiling point up to 500° F. and steam in the presence of a nickel-alumina-aluminum catalyst at pressures ranging from 1 to 10 atmospheres, preferably 1 to 5 atmospheres, and at temperatures ranging from about 700° F. to 1100° F.

Typical hydrocarbon feedstocks useful in this invention are liquified petroleum gases, petroleum naphthas, natural gasoline, kerosene, JP-4 and similar petroleum distillates. The steam-to-hydrocarbon weight ratio of feed material is to be maintained above the minimum required to prevent carbon deposition for the particular feedstock at the desired operating conditions.

To achieve a close approach to equilibrium within the temperature range of 700° F. to 1100° F., a highly active catalyst is required. We have found that it is essential in the practice of this invention to use a novel nickel-alumina-aluminum catalyst containing from 25 to 80% by weight nickel, 10 to 60% by weight alumina and the balance aluminum.

As a typical example, the catalyst used in this invention is prepared as follows: An alloy composed of approximately 42 weight percent nickel and 58 weight percent aluminum is crushed into particles of one-half inch diameter or less, and treated with twice its weight of a 0.5 N sodium hydroxide solution in water. When this nickel-aluminum alloy is treated with a sodium hydroxide solution, a reaction occurs resulting in evolution of hydrogen and formation of sodium aluminate and alumina. Hydrogen is allowed to evolve until the desired conversion of aluminum is obtained, preferable 30 to 85%. During this reaction, the temperature of the mixture is maintained at its boiling point by external heating. After the desired conversion is obtained, the reaction is quenched with water. The catalyst is then repeatedly washed with tap water equal each time in weight to the weight of the original alloy for a minimum of 15 washings. After this procedure is accomplished, the catalyst is subjected to four equivalent washings with methanol and then stored in methanol for use in the process. Alternatively, the catalyst may be stored in ethanol, dioxane or other suitable media. Typical compositions of the catalyst prepared by the above procedure are as follows:

| Catalyst Batch No. | Composition, weight percent | | |
|---|---|---|---|
| | 1 | 2 | 3 |
| Aluminum | 18.5 | 20.3 | 22.0 |
| Nickel | 44.3 | 42.4 | 55.4 |
| $Al_2O_3 \cdot 3H_2O$ | 37.2 | 37.3 | 22.6 |
| Total | 100.0 | 100.0 | 100.0 |

We have discovered that the process of the invention will operate satisfactorily with feedstocks containing a relatively high proportion of normal olefins and cyclo-olefins and aromatics such as benzene. In prior processes, it has always been necessary to maintain the olefin and aromatics in the feedstock as low as possible.

The second part of the invention involves using the fuel cell waste heat for sustaining the reaction described above and to enhance the temperature distribution within the fuel cell by using the said process as a heat sink.

For purposes of illustration, an embodiment of the invention is shown in the accompanying drawing FIGURE 1 which is a schematic flow diagram of the overall process.

In FIGURE 1, numeral 1 represents a storage vessel wherein the hydrocarbon feedstock, preferable desulfurized, is stored. Preferably, the feedstock is paraffinic hydrocarbons but may contain aromatics and olefins. The hydrocarbons feedstock is pumped through a heat exchanger 2 wherein it is vaporized and then blended with steam from boiler 3 in a mixing nozzle 4. The mixture is maintained at a pressure from 1 to 5 atmospheres depending on the operating conditions, nature of feed and desired product gas. The stream of intimately mixed hydrocarbon vapors and steam is then passed through a preheat zone 5 wherein it is preheated to initial reaction temperature by the effluent gases from a molten carbonate fuel cell. The mixture of hydrocarbon vapors and steam then pass into the reactor 6 through beds of nickel-containing catalyst as herein-above described. The gasification reactions occur here and the hydrocarbons are totally gasified. The resulting effluent which is primarily a mixture of hydrogen, methane, carbon monoxide, carbon dioxide, and undecomposed steam exit from the reaction and pass directly into a molten carbonate fuel cell. The hydrogen reformers are arranged external to the fuel cell and a plurality of such cells are arranged adjacent to the reformers as shown diagrammatically in the drawing at 6.

Figure 2:
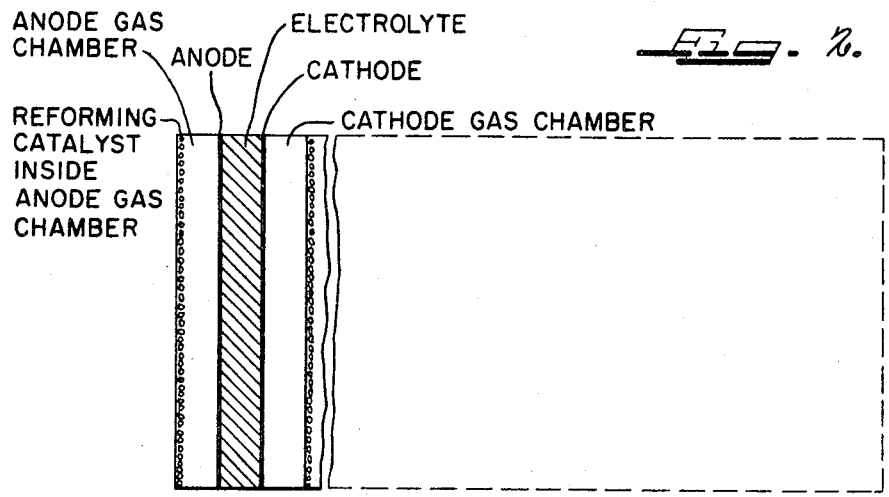
FIG. 2 shows one unit of a fuel cell battery as it may be used in conjunction with the process of the invention.

The construction and operation of the fuel cell per se forms no part of this invention. Molten carbonate fuel cells are well-known in the art. The reformer reactors may be arranged adjacent to and in alternating fashion with the fuel cell system as shown in FIGURE 1, or the reforming reaction may be effected directly in the anode chambers as shown in FIGURE 2. In either arrangement, the waste heat from the fuel cell is used directly to sustain the endothermic reforming reaction for the generation of hydrogen.

FIG. 2 shows one cell of a multi-cell battery having the coventional components as labelled in the drawing. It should be understood that a plurality of such cells are juxtaposed side-by-side to make up a complete fuel cell. As shown in FIGURE 2, reforming catalyst may be supported within the anode gas chamber wherein the reforming reaction is effected.

Fuel cells of the molten carbonate type operate best at temperatures between 950 and 1300° F. and hence reject their waste heat generated by internal resistance heating and polarization effects at this temperature. Since other reforming processes for hydrogen generation from liquid hydrocarbons operate above this temperature it is not possible in those cases to use the waste heat from the fuel cell to sustain the reforming reaction. Only with our new process, using the above mentioned catalyst, does the reforming reaction proceed at temperatures low enough to allow effective use of the waste heat from the fuel cell. The spent gas from the fuel cell passes through the preheat zone 5 and preheats incoming hydrocarbons and steam. The gases then are fed to any desirable unit for waste heat recovery, shown diagrammatically at 7 for the generation of steam used in the process or any other form of process heat whatsoever. Alternatively, the spent fuel cell gas may be burned to utilize residual methane in order to provide waste heat to preheater 5.

The invention will be further described by means of the following examples, it being understood that the examples are given for purposes of illustration only and are not to be construed in any way as restricting the invention beyond the scope of the appended claims.

EXAMPLE I

An apparatus embodying the system shown in FIG. 1 was employed in the gasification of a natural gasoline for production of hydrogen-rich gas.

The pertinent properties of the feedstock were as follows.

Specific gravity: 76.1° API.
ASTM distillation range: 88° F. to 338° F.
Reid vapor pressure: 13.63 p.s.i.g.
Sulphur: 0.0146 wt. percent.

| Composition: | Volume percent |
|---|---|
| Paraffins | 86.0 |
| Napthenes | 11.3 |
| Aromatics | 2.7 |
| Total | 100.0 |

No carbon deposition on the catalyst or liquid hydrocarbon breakthrough occurred and run conditions were as follows:

Catalyst volume: 25 cc.
Reactor pressure: 14.7 p.s.i.g.
Temperature at center of bed: 1060° F.
Steam-to-gasoline weight ratio: 2.93.
Gasoline space velocity: 297 lb./hr.-cu. ft. catalyst.

| Product gas composition (water-free): | Mole percent |
|---|---|
| $CO_2$ | 22.0 |
| $H_2$ | 51.4 |
| $CH_4$ | 25.1 |
| CO | 1.5 |
| Total | 100.0 |

EXAMPLE II

An apparatus embodying the system shown in FIG. 1 was employed in the gasification of a jet fuel (JP-4) for production of hydrogen-rich gas.

The properties of the feedstock were as follows:

Gravity: 56.5°.
ASTM distillation range: 194° F. to 478° F.
Sulphur: 0.0042 wt. percent.

| Composition: | Volume percent |
|---|---|
| Saturates | 84.8 |
| Olefins | 4.6 |
| Aromatics | 10.6 |

No carbon decomposition on the catalyst or hydrocarbon breakthrough occurred and run conditions were as follows:

Catalyst volume: 25 cc.
Reactor pressure: 14.7 p.s.i.g.
Bed temperature: 968° F.
Steam-to-jet fuel weight ratio: 5.16.
Jet fuel space velocity: 183 lb./hr. cu. ft. catalyst.

| Product gas composition (water-free): | Mole percent |
|---|---|
| $CO_2$ | 22.7 |
| $H_2$ | 57.1 |
| $CH_4$ | 18.9 |
| CO | 1.3 |
| Total | 100.0 |

The above product gas was used as fuel for a molten carbonate fuel cell and the results are shown in the following table:

TABLE

| Cell voltage (volts): | Current density (ma./cm.²) |
|---|---|
| 1.0 | 100 |
| 0.8 | 200 |
| 0.6 | 420 |

Figure 3:
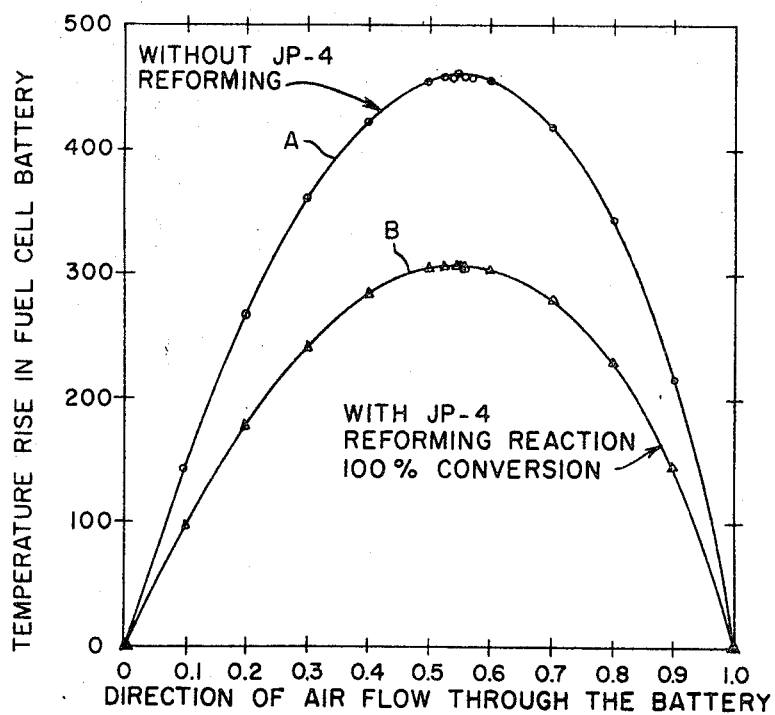
FIG. 3 is a graph showing the temperature profile of a fuel cell used in conjunction with the process.

When the above data is used to predict the temperature distribution in a fuel cell battery according to the theory of Gidaspow and Baker ("Heat Transfer in a Fuel Cell Battery" A.I. Ch. E. Journal, vol. II, No. 5, p. 825, September 1965), curve A of FIGURE 3 is obtained. It can be seen that a temperature rise of 470° F. would exist between the hottest point in the battery and the outer wall. This larger temperature difference is undesirable since it can result in a nonuniform reaction rate and material deterioration problems. If, however, the reforming catalyst described in this invention is distributed uniformly in the walls of the battery in intimate thermal contact with the cells, the exothermic heat from the fuel cell can be used to sustain the endothermic reforming reaction. The net effect is to reduce the heat generation within the battery resulting in the temperature profile B of FIGURE 3. The maximum temperature rise has been reduced to 310° F. by this means, greatly alleviating both materials and reaction problems. Furthermore, the above calculation is made for an assumed 100% conversion of JP-4 in the fuel cell. A more realistic conversion of 90% would result in a further decrease in the maximum temperature. It is readily obvious that by locating the reforming catalyst in the vicinity of the centroid of the battery that a further reduction in maximum temperature could be achieved. Prediction of this new temperature distribution, however, is somewhat more complex.

The above Examples I and II exhibit the three major points of our invention: First, the generation of a hydrogen-rich gas by steam reforming of a liquid hydrocarbon with an end point of 500° F.; second, the use of the gas from the reformer in a molten carbonate fuel cell operating at the same or slightly higher temperature; third, the advantage of using the waste heat from the fuel cell to sustain the reforming reaction and thereby improving the temperature distribution in the battery.

The above description has served to illustrate a specific application of this invention. Other modifications of equipment and operating conditions can readily be made by those skilled in the art. All, however, should be considered within the scope of this invention which is limited solely by the appended claims.

We claim:
1. A process for operating a fuel cell comprising:
   (a) endothermically reacting vaporized liquid hydrocarbon feedstock having an end boing point up to 500° F. with steam in the presence of a catalyst consisting essentially of nickel-alumina-aluminum at a pressure of between 1 to 5 atmospheres and a temperature of between 700° to 1100° F. thereby producing a hydrogen-rich gas by endothermic steam reforming, (b) supplying said hydrogen-rich gas directly to a molten carbonate fuel cell anode to effect an electrochemical exothermic reaction producing electricity, heat and spent fuel, said fuel cell operating at a mean temperature above said reforming reaction temperature, (c) maintaining said reforming reaction in heat exchange relationship with said fuel cell whereby a portion of said exothermic fuel cell heat is withdrawn to said reformer thereby utilizing said reforming reaction as a temperature moderating heat sink for said fuel cell, said exothermic fuel cell heat substantially sustaining said endothermic reforming reaction, whereby the overall efficiency of the fuel cell operation is increased.

2. A process as in claim 1 wherein said nickel-alumina-aluminum catalyst contains 25 to 80 weight percent nickel, 10 to 60 weight percent alumina and the balance aluminum.

3. A process as in claim 1 which includes the step of desulfurizing said liquid hydrocarbon feedstock prior to said reforming reaction step.

4. A process as in claim 1 which includes the step of recovering waste heat from said spent fuel.

5. A process as in claim 4 wherein said recovery step includes preheating said vaporized hydrocarbon and steam prior to reforming by heat exchange with said spent fuel.

6. A process as in claim 4 wherein said recovery step includes burning said spent fuel to provide heat.

7. A process as in claim 1 wherein said reforming reaction step takes place on said catalyst located in said anode chamber of said fuel cell.

8. A process as in claim 1 wherein said liquid hydrocarbon feedstock is selected from natural gasoline, petroleum naphthas, kerosene, liquified petroleum gases and JP-4 jet fuel.

9. A process as in claim 1 wherein said feedstocks include normal olefins, cyclo-olefins and aromatics.

10. A process as in claim 1 wherein said pressure is maintained at substantially 1 atmosphere and said catalyst contains 44–56 weight percent nickel, 22–38 weight percent alumina, and the remainder aluminum.

References Cited

UNITED STATES PATENTS

| | | | |
|---|---|---|---|
| 3,271,325 | 9/1966 | Davies et al. | 252—466 |
| 1,915,473 | 6/1933 | Raney | 252—466 |
| 2,750,261 | 6/1956 | Ipatieff et al. | |
| 2,980,749 | 4/1961 | Broers | 136—86 |
| 3,146,131 | 8/1964 | Linden et al. | 136—86 |
| 3,150,657 | 9/1964 | Schultz et al. | 136—86 X |
| 3,177,097 | 4/1965 | Beals | 136—86 |
| 3,266,938 | 8/1966 | Parker et al. | 136—86 |
| 3,297,483 | 1/1967 | McEvoy | 136—86 |

FOREIGN PATENTS

| | | |
|---|---|---|
| 468,059 | 9/1950 | Canada. |
| 557,778 | 5/1958 | Canada. |

ALLEN B. CURTIS, Primary Examiner

U.S. Cl. X.R.

23—212; 252—466